United States Patent [19]
Sutliff et al.

[11] Patent Number: 5,820,077
[45] Date of Patent: Oct. 13, 1998

[54] AIRCRAFT RADOME AND INTEGRAL ATTACHING STRUCTURE

[75] Inventors: Gary C. Sutliff; Matthew T. Cackett; Teresa A. Guy, all of San Diego, Calif.

[73] Assignee: McDonnell Douglas Technologies, Inc., Mesa, Ariz.

[21] Appl. No.: 533,931

[22] Filed: Sep. 26, 1995

[51] Int. Cl.⁶ ...................................................... B64C 1/36
[52] U.S. Cl. ........................... 244/119; 244/121; 244/131
[58] Field of Search ................................. 244/117 R, 119, 244/121, 131; 156/173, 169, 189, 245, 182, 185, 188

[56] References Cited

U.S. PATENT DOCUMENTS

| | | |
|---|---|---|
| 3,545,146 | 12/1970 | Kerr . |
| 3,616,140 | 10/1971 | Copeland et al. . |
| 3,757,698 | 9/1973 | Jacobson . |
| 3,978,256 | 8/1976 | James ....................................... 244/119 |
| 4,011,819 | 3/1977 | Kessler . |
| 4,086,378 | 4/1978 | Kan et al. ................................ 244/119 |
| 4,344,995 | 8/1982 | Hammer .................................. 244/131 |
| 4,520,364 | 5/1985 | Perry . |
| 4,581,615 | 4/1986 | Levy . |
| 5,103,239 | 4/1992 | Verzemnieks et al. . |
| 5,129,990 | 7/1992 | Binnie, Jr. et al. . |
| 5,223,067 | 6/1993 | Hamamolo ............................... 244/119 |
| 5,460,673 | 10/1995 | Cahuzac .................................. 244/131 |

Primary Examiner—Galen L. Barefoot
Attorney, Agent, or Firm—Donald E. Stout

[57] ABSTRACT

A radome structure having an integrally attached attaching structure for attachment to an aircraft is disclosed, the attaching structure being affixed to a rearward portion of the radome. The attaching structure preferably comprises, at least in part, a core material which is capable of strengthening the attaching structure, thereby making it stronger than the material from which the radome shell is fabricated.

2 Claims, 2 Drawing Sheets

FIG. 1
PRIOR ART
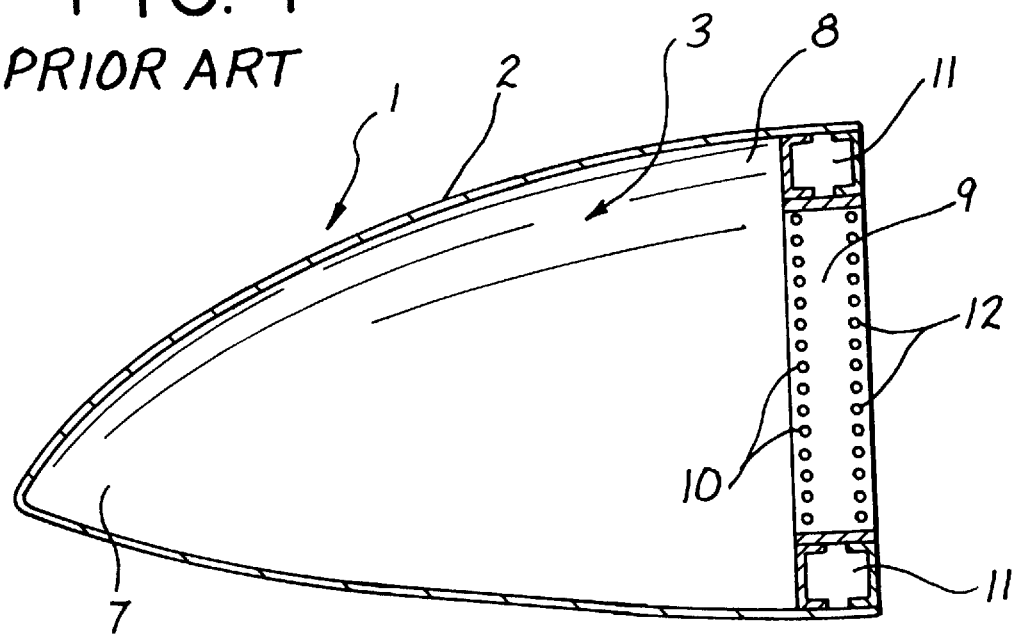
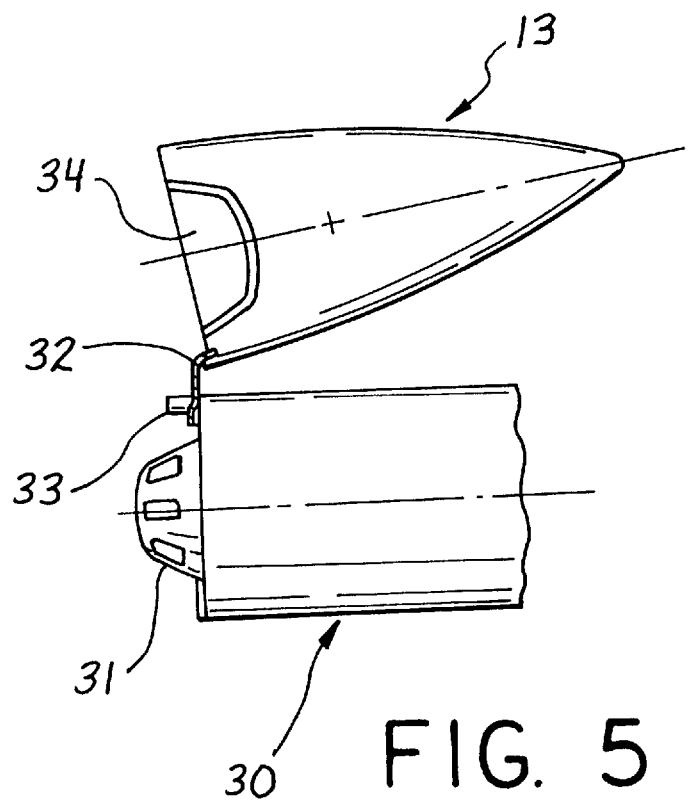
FIG. 5

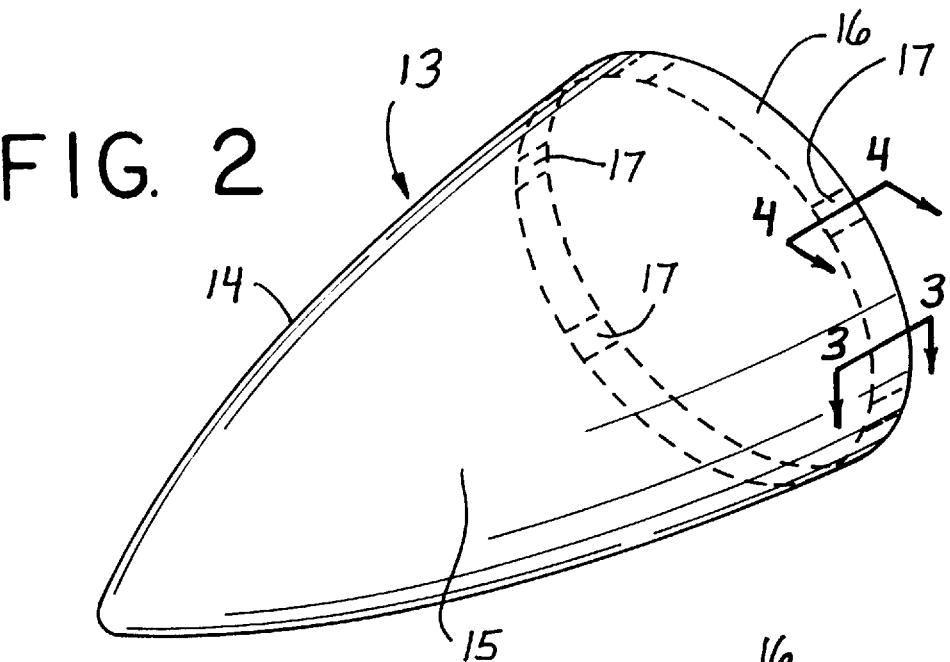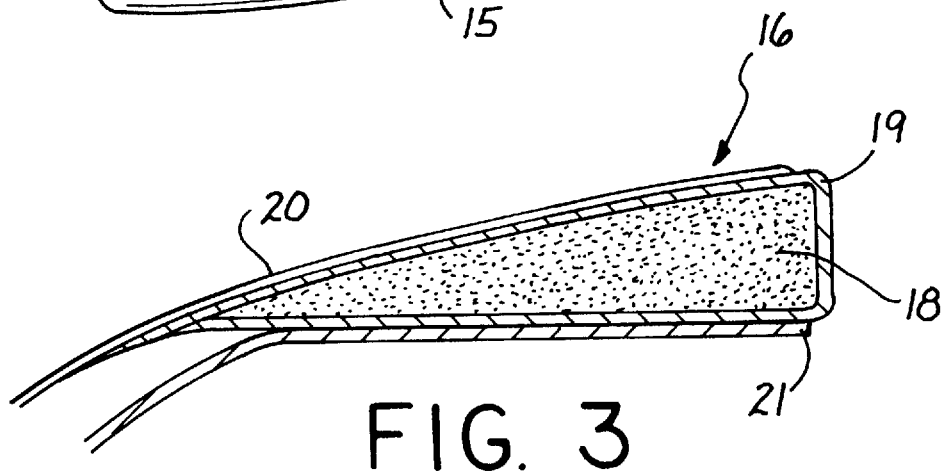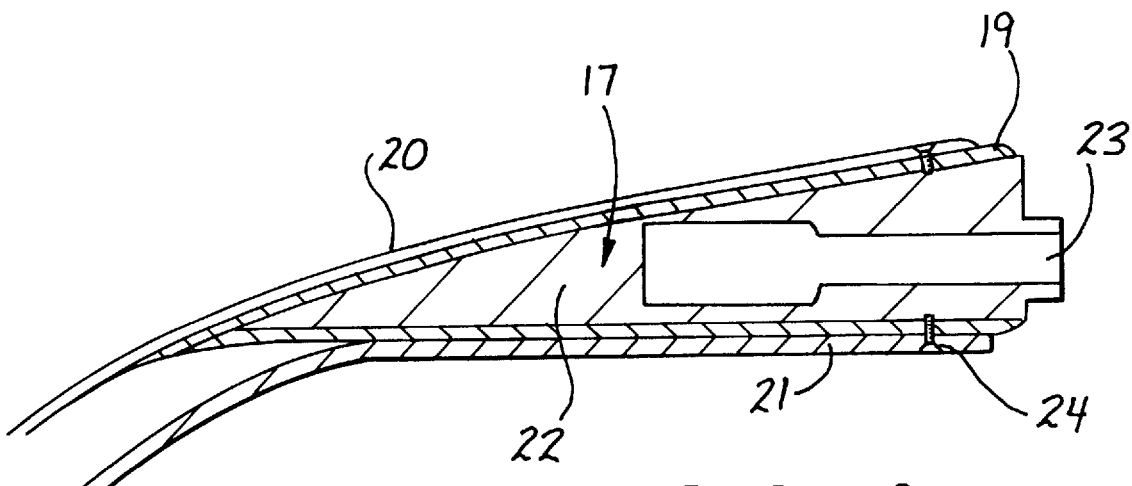

AIRCRAFT RADOME AND INTEGRAL ATTACHING STRUCTURE

BACKGROUND OF THE INVENTION

This invention relates to aircraft fuselage radomes with an integrally incorporated attaching structure for affixing the radome to the body of the aircraft A radome is a compound curved shell structure used to enclose or protect equipment housed in or associated with high speed aircraft. Radomes can be formed in a variety of shapes, depending upon the type of aircraft with which the radome is being used. One common shape is the approximately conical shape seen on numerous jet aircraft. The conical shape is occasionally supplemented with a pointed or needle-like projection extending beyond the conical shape.

In various types of aircraft and missiles carrying radar equipment, an antenna is mounted in the nose of the craft and enclosed and protected by a radome or other aerodynamic surface. The radome is constructed of materials strong enough to withstand the aerodynamic forces to which it is subjected, and is attached to the nose of the craft through an attaching structure which is similarly designed to withstand the very substantial forces exerted on the radome during flight of the aircraft.

Current aircraft nose radomes are frequently composite structures which are attached to the aircraft through an attachment ring. The attachment ring provides the structural joint to support the radome shell. The attachment ring distributes the structural load around the shell of the radome, while at the same time providing an attachment to the aircraft sufficiently secure to withstand the forces applied to the radome and attachment ring during flight. Typically, attachment rings are made up of several component parts which are joined together with mechanical fasteners such as rivets, bolts, or screws. The radome is manufactured separately, and is joined to an attachment ring in a large assembled fixture.

The manufacture of the radome-attachment ring assembly has a number of inherent shortcomings affecting its use and performance. Fabrication time and labor required to assemble the radome and attachment ring is one consideration. Attachment rings have frequently been attached to the radome shell with a large number of bolts or screws, thereby adding substantially to the cost of fabrication. The latch fasteners which fasten the attachment ring to the aircraft must be positioned so that they distribute the aerodynamic forces effectively, which in turn creates a situation where the forces must be absorbed to a considerable extent by the radome material. The attachment ring also takes up a certain amount of space in and around the nose of the aircraft, thereby subtracting from the space available for the radar and other electronic devices. The attachment ring also produces RF scattering around the edge of the aircraft being enclosed by the radome and ring. The attachment ring can also be subjected to accidental impacts during displacement of the radome when it is removed to service the equipment covered by the radome.

If the attachment ring is a metal ring, such as an aluminum or steel ring for example, the different coefficients of expansion for the metal ring and the polymeric composite or any material other than a similar metal can cause problems of poor fit between the radome and attachment ring as the materials heat up due to the friction between the materials and the surrounding air or elements. There are many techniques for attaching radomes to aircraft through attaching structures such as attachment rings. Few of them, however, have been able to compensate fully for the different thermal expansions of the different materials making up the radome-attachment ring assembly. Joints allowing for differential expansion are difficult to use to produce a firm attachment of the materials to one another. Bonding with elastomeric resins can alleviate the problem but does not eliminate it.

SUMMARY OF THE INVENTION

The present invention comprises an aircraft radome having an attaching structure integrally formed as part of the radome structure. The radome has a forward portion and a rearward portion connected to each other. The rearward portion is the portion attached to the aircraft, and contains the attaching structure suitable for attachment to an aircraft. To be an integral and non-removable part of the radome, it is preferable that the attaching structure, preferably an attachment ring, be affixed to the rearward portion of the radome structure by means of the same material used in forming the radome itself, thereby in some preferred embodiments forming a laminate structure where the interior and exterior radome skins encase a material functioning as the attaching structure. Other non-detachable linkages are also suitable for use in this invention. As an example, the attaching structure can be joined to the radome material by some plastic forming process which is capable of forming a strong, non-detachable joint.

The present invention also comprises a method for attaching a radome to an aircraft, which method comprises a) forming an attaching structure as an integral, non-detachable portion of a radome, b) incorporating latch fittings and fasteners into the attaching structure and the aircraft, and c) attaching the radome to the aircraft by fastening the attaching structure to said aircraft. This is accomplished by inserting latch fasteners into the latch fittings and securing the fasteners within the fittings.

In a preferred embodiment, the invention also comprises releasing the latch fasteners from the latch fittings and moving the radome from its position on the forward portion of the aircraft where it forms the nose of the aircraft, to a position offset from its forward position. The radome is moved by swinging it on a hinge attached both to the aircraft and to the radome, so that easy access to the equipment enclosed and protected by the radome may be afforded. Once the equipment is services, the radome may be moved back into its equipment-enclosing position.

The invention, together with additional features and advantages thereof may best be understood by reference to the following description taken in conjunction with the accompanying illustrative drawings.

BRIEF DESCRIPTION OF THE DRAWINGS

FIG. 1 is a cross-sectional view of a prior art radome and associated attach ring.

FIG. 2 is a perspective view of a radome and integrally formed attachment ring, showing the attachment ring as an integral part of the radome structure.

FIG. 3 is a cross-sectional view of the integrally formed attachment ring, taken along line 3—3 of FIG. 2.

FIG. 4 is a cross-sectional view of a latch fastener and latch fitting embedded in the attachment ring, and taken along line 4—4 of FIG. 2.

FIG. 5 is a top view of the radome and forward fuselage of an aircraft, showing the radome in a displaced or opened position with respect to the aircraft fuselage.

DETAILED DESCRIPTION OF THE PREFERRED EMBODIMENTS

FIG. 1 shows a prior art radome 1 having a shell 2 enclosing a space 3. The radome has a forward portion 7 and a rearward portion 8. Attached to the rearward portion 8 of the radome is an attachment ring 9 which is fastened to the radome shell material by two rows of fasteners 10. Shown at the top and bottom of attachment ring 9 are hollow cavities 11 which represent the hollow cross-sectional interior of the attachment ring 9.

FIG. 2 shows a radome 13 of the present invention having a shell 14 enclosing a space 15. Space 15 is used to enclose and protect sensitive electronic equipment from the effects of high speed wind, water, and the like. The radome also contains an integrally molded and incorporated attachment ring 16, shown in phantom lines to indicate its lack of visibility from the angle of view of FIG. 2. Built into the attachment ring 16 are latch fittings 17 for receiving latch fasteners, which are shown in detail in FIG. 4. The latch fittings 17 attach the radome to the aircraft.

FIG. 3 is a cross-sectional view, taken along line 3—3 of FIG. 2, of the integrally formed attachment ring 16 which has a foam core 18, an innermost laminate skin 19 which encloses the foam core 18, an outer laminate skin 20 which covers and protects the outside surface of the innermost laminate skin 19, and an inner laminate skin 21 which covers and protects the inside surface of the innermost laminate skin 19. Because of the manner in which the outer and inner laminate skins 20 and 21 respectively, combine to form the shell 14, the attachment ring 16 can be seen to be an integrally formed portion of the radome 13.

FIG. 4 is a cross-sectional view, taken along line 4—4 of FIG. 2, illustrating one of the latch fittings 17. The latch fitting 17 which is conventional in construction, has a metallic core 22 surrounded by the same laminate skins 19, 20, and 21 surrounding the foam core 18 of the attachment ring. Although not shown in FIG. 4, the metallic core could also be surrounded with a coating of the foam core 18, which would then be encased by the same laminate skins shown in FIG. 3. A latch fastener 23 is shown inserted into the latch fitting 17, Mechanical fasteners 24 may be employed to secure the latch fittings 17 in place and prevent their movement within the innermost laminate skin.

FIG. 5 illustrates the forward fuselage and radome of a typical aircraft constructed in accordance with the principles of the invention. The forward fuselage 30 contains electronic equipment 31 mounted in the nose. The radome 13 optionally contains a hollow compartment 34 within its interior which is sized to enclose the portion of the electronic equipment 31 which protrudes from the forward fuselage 30. The radome 13 is shown in an open position displaced from its operational position enclosing the electronic equipment 31 mounted in the nose. The radome is held in the displaced open position in a conventional manner by a hinge strap 32 mounted on a hinge pin 33 which is affixed to the aircraft fuselage 30. Following servicing of the equipment enclosed by the radome, the radome can be returned to its operational equipment-enclosing position.

The radome of this invention is typically used on aircraft, including fixed wing aircraft, rotorcraft, and guided or ballistic missiles. Radomes may be designed differently, depending upon the type of aircraft for which they are adapted. For example, a missile need not have latches for attaching the radome thereto, since it is only used once and therefore does not require servicing.

The radome can be manufactured from any of a variety of materials, as long as the objective of incorporating the attaching structure as an integral part of the radome can be met. Metals such as aluminum and steel have been used for many years in the construction of radomes and can be used herein. It can be appreciated, however, that producing an attachment ring that is integrally incorporated into a metallic radome can involve molding, casting, or stamping problems far more challenging and expensive than performing a similar integral production from polymeric or resinous materials.

There are many polymeric materials suitable for use in this invention which can optionally be reinforced or otherwise modified by inclusion of fibrous and particulate reinforcement. Polyamides, polyimides, polyesters, both thermoplastic and thermoset, are examples of some suitable materials. Reinforcements and non-polymeric additives include glass fiber, aluminum silicates in fibrous and particulate form, graphite fibers and particles, silica, silicon compounds, and silicon nitride, all in particulate or fibrous form. Ceramic materials can also be used in a sheet or laminate form in addition to the particulate and fibrous forms mentioned above.

Radomes constructed in accordance with the preferred embodiment are produced by preparing sheets of resinous materials, which have been modified by inclusion of various strengthening aids. The reinforced resinous sheets can be laid up upon one another to produce a laminate having superior strength properties when compared to any of the individual laminate sheets themselves. The sheets can be adhesively attached to one another using any of a number of adhesives. Polymers in an uncured or partially cured state are commonly used to secure polymeric sheets and can be used here. Polyester and epoxy resins are two preferred materials for use as adhesives. This invention is not limited to the use of any of the many resinous materials and non-resinous reinforcing or modifying agents in the fabrication and construction of radomes, except insofar as it is necessary that the materials of construction be capable of producing an integrally formed attaching structure for attaching the radome to the aircraft.

The attaching structure is preferably formed of at least one material or combination of materials which is stronger than the material from which the radome shell is formed. This is because of the need for the attaching structure to withstand the greater stresses at the juncture of the radome shell with the aircraft than are imposed on the radome at other points on the shell. Even though the radome skins comprise part of a preferred radome attachment ring, the skins are supplemented with a core material which adds strength to the attaching structure. The attaching structure can also be formed of wholly different materials from the materials used to form the radome shell. In such a case the two or more different materials will still be joined to form a radome structure having a radome shell and an aircraft-attaching structure integrally bonded to the radome shell. The integral, non-detachable bonding of the different materials can be accomplished very satisfactorily by joining polymeric laminates which comprise portions of both the radome shell and the attaching structure.

Examples of suitable core materials include a variety of polymeric materials, such as polyamides, polyimides, and polyesters, both thermoplastic and thermoset. The foregoing polymers can be modified and reinforced with the usual and with extraordinary reinforcing fibers and particulate materials. Another material which can be used as part of the attaching structure is an aluminum or some other metallic ring which can be encased within the interior and exterior radome skins. Ceramic materials are also useful as materials for attaching structures.

A preferred construction for an attaching structure is one in which the attaching structure contains at least one component which is different from the materials making up the rest of the radome shell. Strength can be increased in the attaching structure by altering the configuration of the material itself. The different materials can be the same polymers, shaped into a different structure such as a foam or honeycombed configuration, or the polymers can be the same with different types of reinforcement, or with a different orientation of fibrous reinforcement within the polymeric matrix. Alternatively, the materials can be entirely different from one another, such as polyimide laminates forming the radome shell, and also encasing a foamed ceramic strengthening core, thereby forming the attaching structure. It can be particularly advantageous for the core material positioned between the radome skins to be a honeycombed material, or a fibrous laminate where the fibers of the laminate are oriented in a direction different from the fiber orientation of the radome skins. The term "configuration" is used herein to refer to the structure of the material being referred to, such as material configured in a foamed, honeycombed, solid, particulate or fiber-reinforced manner, as well as to the orientation of the material with respect to other material, such as fiber reinforced laminates laid up in a 90° orientation with respect to another fiber-reinforced laminate.

The attaching structure is preferably an attachment ring which encircles the entire approximately circular rearward opening of the radome. The attaching structure can also be provided in the form of a series of discontinuous reinforced regions positioned around the edge of the rearward portion of the radome. The discontinuous regions can be formed of the same materials and can be formed of the same laminates or foamed or honeycombed materials as an attachment ring which extends continuously around the edge of the rearward portion of the radome.

Fittings and fasteners can be selected from a number of designs and configurations. Preferred are those which are capable of being easily secured to form a firm, tight bond and junction, and which can further be easily disengaged to permit the radome to be removed from its operational equipment enclosing and protecting position. The fittings and fasteners should also be capable of being reused a number of times without the need for replacing them.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A radome structure having a forward portion and a rearward portion connected to said forward portion, said rearward portion having an attaching structure formed of a resinous composite material and being adapted for attachment to an aircraft, said attaching structure being integrally formed as a part of the radome structure and having at least one latch fitting incorporated thereinto, the remainder of said radome structure also being formed of a resinous composite material and being mounted on the aircraft so that it is capable of being moved between an equipment enclosing position and an open position;

wherein said attaching structure is a laminated structure formed from laminates also making up the radome structure, and a strengthening core material, the attaching structure being formed from said strengthening core material encased by said laminates making up the radome structure.

2. A radome structure according to claim 1 wherein said attaching structure comprises an attachment ring.

* * * * *